US011285999B2

(12) United States Patent
Jaynes (10) Patent No.: US 11,285,999 B2
(45) Date of Patent: Mar. 29, 2022

(54) FRAME EXTENSION FOR VEHICLE

(71) Applicant: Fontaine Modification Company, Charlotte, NC (US)

(72) Inventor: Dan R. Jaynes, Charlotte, NC (US)

(73) Assignee: Fontaine Modification Company, Charlotte, NC (US)

( * ) Notice: Subject to any disclaimer, the term of this patent is extended or adjusted under 35 U.S.C. 154(b) by 103 days.

(21) Appl. No.: 16/834,002

(22) Filed: Mar. 30, 2020

(65) Prior Publication Data

US 2020/0317270 A1 Oct. 8, 2020

Related U.S. Application Data

(60) Provisional application No. 62/828,655, filed on Apr. 3, 2019.

(51) Int. Cl.
*B62D 21/03* (2006.01)
*B62D 65/10* (2006.01)
*B60D 1/04* (2006.01)
*B60K 11/04* (2006.01)

(52) U.S. Cl.
CPC ............. *B62D 21/03* (2013.01); *B62D 65/10* (2013.01); *B60D 1/04* (2013.01); *B60K 11/04* (2013.01)

(58) Field of Classification Search
CPC ........ B62D 21/02; B62D 21/03; B62D 21/14; B62D 65/10; B60K 11/04
See application file for complete search history.

(56) References Cited

U.S. PATENT DOCUMENTS

| 1,601,140 A | * | 9/1926 | Murray, Jr. | ............ B62D 21/02 280/800 |
| 4,738,464 A | | 4/1988 | Putnam | |
| 5,725,247 A | * | 3/1998 | Nilsson | .................. B62D 21/02 280/781 |
| 6,055,788 A | * | 5/2000 | Martin | .................... B62D 21/02 296/204 |
| 6,199,894 B1 | * | 3/2001 | Anderson | .............. B62D 61/12 280/638 |
| 7,303,219 B2 | | 12/2007 | Trabant et al. | |
| 7,472,919 B2 | | 1/2009 | Pratt et al. | |

(Continued)

FOREIGN PATENT DOCUMENTS

EP 2596966 A1 5/2013

*Primary Examiner* — Frank B Vanaman
(74) *Attorney, Agent, or Firm* — Andrus Intellectual Property Law, LLP (57) ABSTRACT

A frame extension for a vehicle having a pair of frame rails and a connecting cross member includes a vertical main plate having an inner face attached to an outer face of a frame rail; a vertical forward plate parallel to the vertical main plate and offset from the vertical main plate such that when the frame extension is installed, the vertical forward plate is located outwardly of the vertical main plate; a horizontal main flange abutting an outer face of the vertical main plate and abutting an outer face of the vertical forward plate; and a vertical spacer member connecting the outer face of the vertical main plate to an inner face of the vertical forward plate. The inner face of the vertical main plate is attached to the cross member. The vertical spacer member is approximately aligned with or forward of a front face of the cross member.

18 Claims, 7 Drawing Sheets

(56) References Cited

U.S. PATENT DOCUMENTS

| | | | |
|---|---|---|---|
| 7,568,856 B2 * | 8/2009 | Wu | B62D 21/14 |
| | | | 280/789 |
| 8,944,207 B2 * | 2/2015 | Gulan | B62D 21/07 |
| | | | 180/312 |
| 9,771,041 B2 | 9/2017 | Jaynes | |
| 2003/0178834 A1 | 9/2003 | Grimm et al. | |
| 2006/0219462 A1 * | 10/2006 | Martin | B62D 21/02 |
| | | | 180/292 |
| 2008/0265602 A1 * | 10/2008 | Branning | B62D 21/14 |
| | | | 296/26.08 |
| 2011/0163527 A1 * | 7/2011 | Hunt | B62D 27/065 |
| | | | 280/785 |
| 2014/0346299 A1 | 11/2014 | Sterling | |

* cited by examiner

FRAME EXTENSION FOR VEHICLE

CROSS-REFERENCE TO RELATED APPLICATION

This application claims the benefit of U.S. Provisional Application Ser. No. 62/828,655, filed Apr. 3, 2019, which is incorporated herein by reference in its entirety.

FIELD

The present disclosure relates generally to commercial vehicles and, in particular, to a frame extension that permits accessories to be installed on the front end of such vehicles.

BACKGROUND

U.S. Pat. No. 9,771,041, which is hereby incorporated by reference, discloses an extension for a vehicle having a frame rail and a cross member with a top flange and a bottom flange, with the cross member connected to the frame rail. The extension includes a top bracket having a vertical portion and a top horizontal member, where the top bracket vertical portion has a leading end portion and a trailing end portion. The trailing end portion is adapted to be attached to the frame rail and the top horizontal member is adapted to engage the cross member top flange. An outer plate is attached to the leading end portion of the vertical portion of the top bracket and has a middle horizontal member. A spacer block is positioned between and attached to the top and middle horizontal members. A bottom bracket has a vertical portion and a bottom horizontal member. The bottom bracket vertical portion is attached to the outer plate and the bottom horizontal member is adapted to be attached to the bottom flange of the cross member.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example, the present disclosure is of a frame extension for a vehicle having a pair of longitudinal frame rails and a cross member connecting the pair of frame rails. The frame extension includes a vertical main plate having an inner face configured to attach to an outer face of a frame rail in the pair of frame rails; a vertical forward plate parallel to the vertical main plate and offset from the vertical main plate such that when the frame extension is installed on the frame rail, the vertical forward plate is located outwardly of the vertical main plate; a horizontal main flange abutting an outer face of the vertical main plate and abutting an outer face of the vertical forward plate; and a vertical spacer member connecting the outer face of the vertical main plate to an inner face of the vertical forward plate. The inner face of the vertical main plate is configured to attach to the cross member. The vertical spacer member is configured to be approximately aligned with or forward of a front face of the cross member when the frame extension is installed on the frame rail.

According to another example, a method for extending a frame of a vehicle having a pair of longitudinal frame rails and a cross member connecting the pair of frame rails includes providing a pair of frame extensions. Each frame extension has: a vertical main plate having an inner face configured to attach to an outer face of a respective frame rail in the pair of frame rails; a vertical forward plate parallel to the vertical main plate and offset from the vertical main plate such that when the frame extension is installed on the respective frame rail, the vertical forward plate is located outwardly of the vertical main plate; a horizontal main flange abutting an outer face of the vertical main plate and abutting an outer face of the vertical forward plate; and a vertical spacer member connecting the outer face of the vertical main plate to an inner face of the vertical forward plate. The method includes positioning each frame extension such that each vertical spacer member is approximately aligned with or forward of a front face of the cross member; attaching each vertical main plate to the outer face of the respective frame rail; and attaching the inner face of each vertical main plate to the cross member.

BRIEF DESCRIPTION OF THE DRAWINGS

The present disclosure is described with reference to the following Figures. The same numbers are used throughout the Figures to reference like features and like components.

DETAILED DESCRIPTION

Commercial or vocational vehicles, such as medium or heavy duty trucks, are used for a variety of applications. It may be desirable to attach accessories to a truck for use in a particular application. Such accessories may include, but are not limited to, snow plows, wenches, hose reels, tread plates, auxiliary bumpers, crash bars, brush guards, or pavement spreaders. These accessories are typically attached to the front of the truck.

Accessories such as those described above may generate very heavy loads during use and are thus preferably attached to the frame of the truck, as that typically is the strongest structure of the vehicle. Oftentimes the space available to access the frame rails on the front of the truck to attach the accessories is very limited. For example, the truck front bumper may be positioned close to the front or leading ends of the frame rails.

In view of the above, it is desirable to provide a frame extension and method for installation thereof that permits accessories to be economically and securely installed to a vehicle's frame.

While the frame extensions are described below in terms of installation onto the front of a truck, it should be understood that the frame extensions could be used on other types of vehicles and installed in alternative locations on the vehicle. In addition, while embodiments of the frame extension are described below as using bolts for attachments, alternative fasteners and attachment methods known in the art may be used. Connections between components not shown with bolt holes are generally made by forming the part as a whole and then cutting and/or bending the part and/or by welding separate components together. Additionally, although each of the components is preferably constructed from steel, alternative durable materials may be used.

Figure 1:
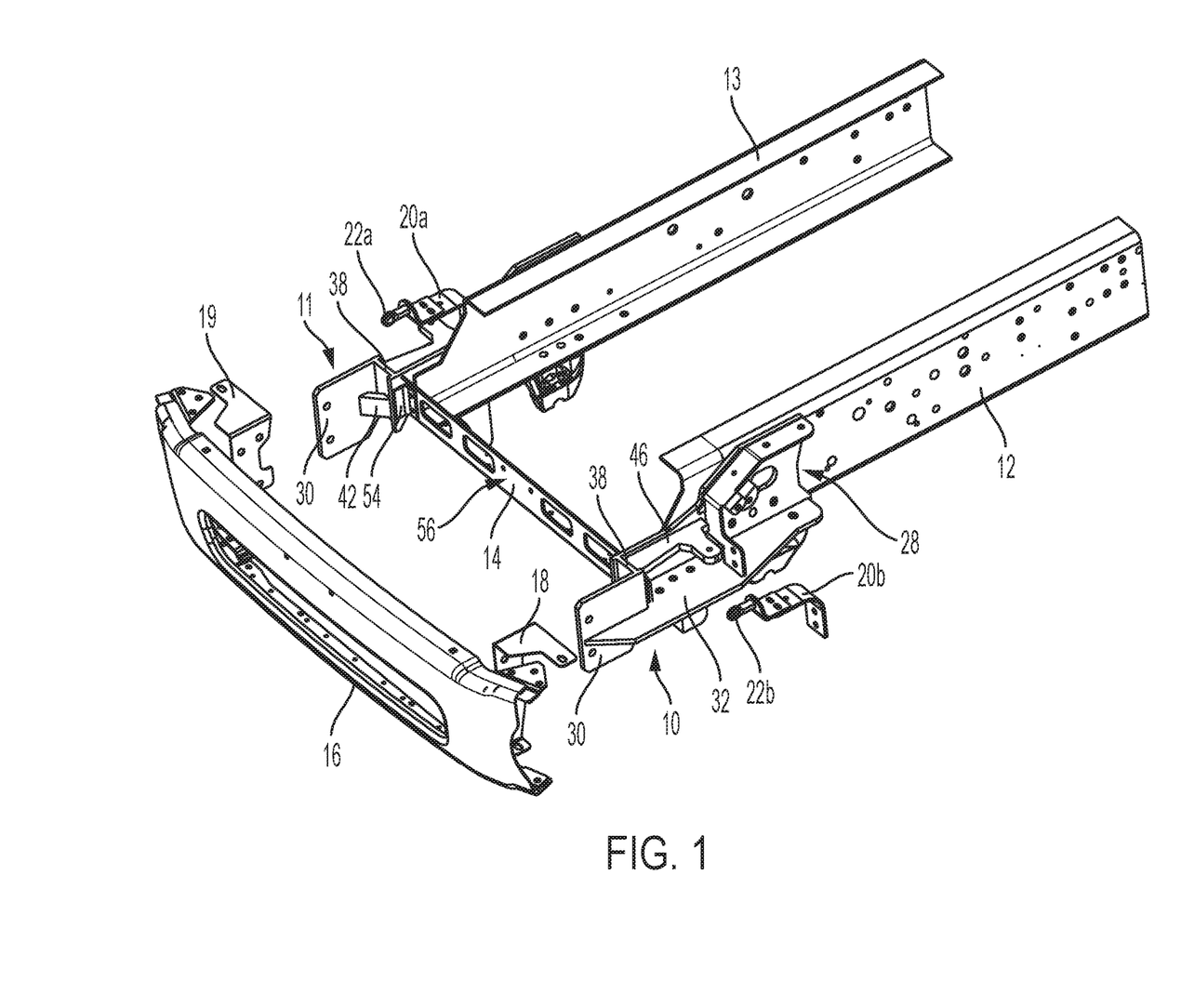
FIG. 1 illustrates an isometric view of a frame extension on a vehicle frame according to one embodiment of the present disclosure.

FIG. 1 illustrates a frame extension 10 for a vehicle having a pair of longitudinal frame rails 12, 13 and a cross member 14 connecting the pair of frame rails 12, 13. Although only the frame extension 10 on the frame rail 12 will be described herein below, it should be understood that the frame extension 11 on the frame rail 13 is a mirror image of the frame extension 10, and thus the below description applies to both frame extensions 10 and 11 equally.

The assembly of FIG. 1 is shown with the original equipment manufacturer (OEM) bumper 16 removed. The bumper 16 was originally attached to the OEM frame rails 12, 13 by way of brackets 18, 19. The bumper 16 and brackets 18, 19 are removed prior to the frame extensions 10, 11 being installed at the front ends of the frame rails 12, 13. Also to prepare the assembly of FIG. 1 for the frame extensions 10, 11, the cross member 14 is cut at its left and right ends, so that opposite ends of the cross member 14 can abut the inner faces of the frame extensions 10, 11, as will be described more fully herein below. As will also be described more fully herein below, the cross member 14 can be the OEM cross member that holds a radiator and is originally connected to the front ends of the frame rails 12, 13. Also shown as part of the assembly are hood mount brackets 20a, 20b, which can attach to the frame extensions 10, 11 and which have heim joints 22a, 22b for allowing the hood of the vehicle to rotate with respect to the frame.

Figure 2:
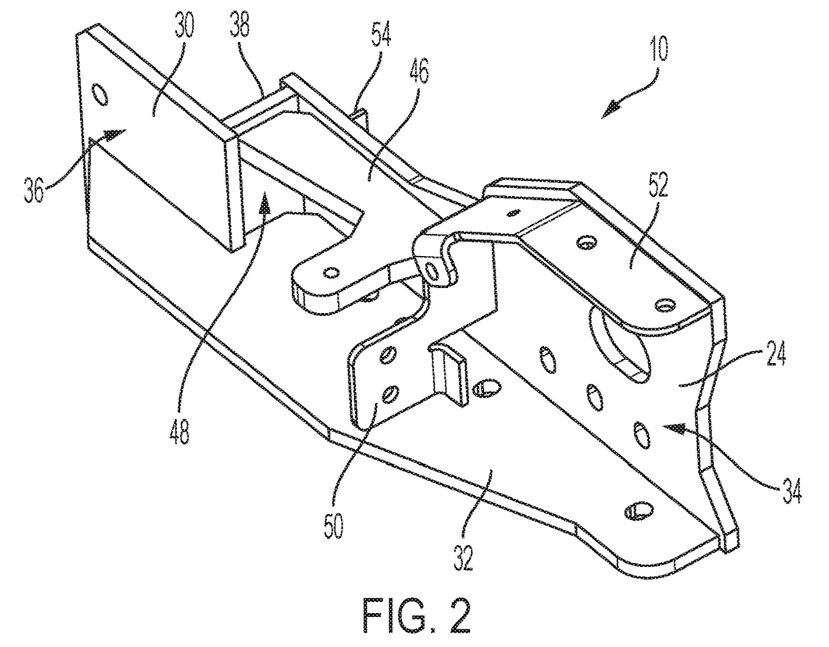
FIG. 2 illustrates an isometric view of a first side of a frame extension according to the embodiment of FIG. 1.
Figure 3:
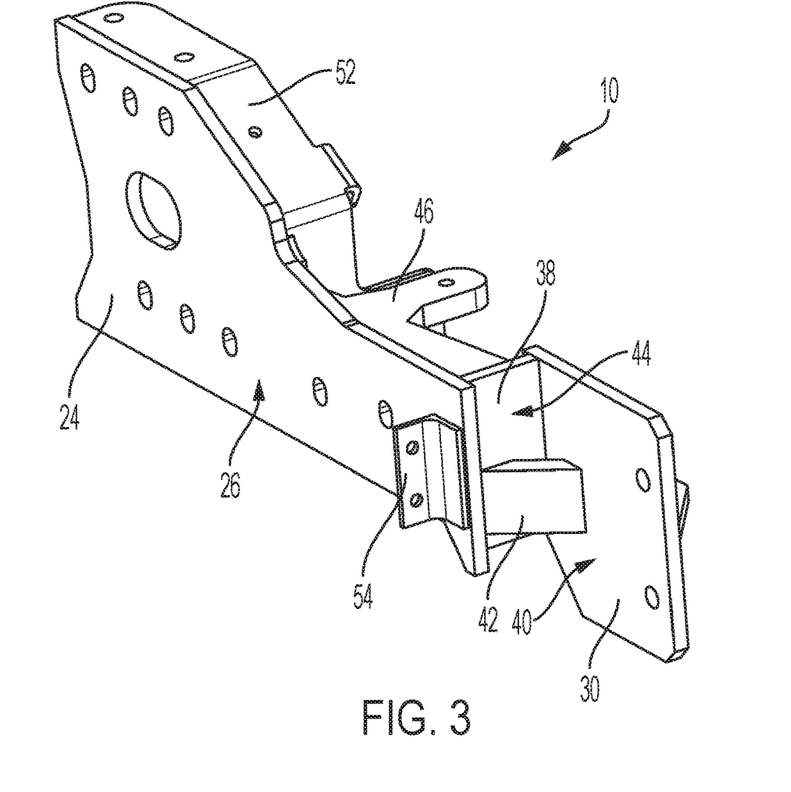
FIG. 3 illustrates an isometric view of an opposite side of the frame extension of FIGS. 1 and 2.

FIGS. 2 and 3 illustrate the frame extension 10 in isolation. FIG. 2 shows the outer side of the frame extension 10, while FIG. 3 shows the inner side thereof. The frame extension 10 includes a vertical main plate 24 having an inner face 26 configured to attach to an outer face 28 of the frame rail 12b in the pair of frame rails. The vertical main plate 24 has a tapered shape, such that the rear end of the vertical main plate 24 has a greater height than the front end thereof.

The frame extension 10 further includes a vertical forward plate 30 parallel to the vertical main plate 24 and offset from the vertical main plate 24 away from the frame rail 12. In other words, when the frame extension 10 is installed on the frame rail 12, the vertical forward plate 30 is located outwardly of the vertical main plate 24. A horizontal main flange 32 abuts an outer face 34 of the vertical main plate 24 and abuts an outer face 36 of the vertical forward plate 30. A vertical spacer member 38 connects the outer face 34 of the vertical main plate 24 to an inner face 40 of the vertical forward plate 30. A bracket 42 is connected between the inner face 40 of the vertical forward plate 30 and a front face 44 of the vertical spacer member 38. The bracket 42 adds strength and rigidity to the connection between the vertical spacer member 38 and the vertical forward plate 30. A horizontal bracket 46 configured for mounting the hood mount bracket 20b (FIG. 1) to the frame extension 10 is connected between a rear face 48 of the vertical spacer member 38 and the outer face 34 of the vertical main plate 24. Another bracket 50 extends from a flange 52 on the outer face 34 of the vertical main plate 24. At its lower end, bracket 50 is also connected to the hood mount bracket 20b.

Returning to FIG. 1, it can be seen that the inner face 26 of the vertical main plate 24 is configured to attach to the cross member 14. This can be done by way of a bracket 54 (see also FIG. 3) connecting the inner face 26 of the vertical main plate 24 to the cross member 14. In another example, a separate bracket 54 is not provided, but rather a flange or similar protrusion is built into or pre-connected to the cross member 14. The bracket 54 allows the OEM cross member 14 to be attached to the frame extensions 10, 11 which is beneficial because the cross member 14 does not need to be moved during installation of the frame extensions 10.

The vertical spacer member 38 is configured to be approximately aligned with (plus or minus two inches) or forward of a front face 56 of the cross member 14 when the frame extension 10 is installed on the frame rail 12. Placing the vertical spacer member 38 at this location on the front frame extensions 10, 11 also allows the OEM cross member 14 to remain in place during installation of the front frame extensions 10, 11 because the vertical main plate 24 can be attached to the cross member 14 by virtue of its extending forwardly of the front end of the frame rail 12 or 13 to which it is connected.

Note that although the vertical spacer member 38 is shown as being perpendicular with respect to both the vertical main plate 24 and the vertical forward plate 30, the vertical spacer member 38 can instead be situated at non-right angles with respect to the vertical main plate 24 and the vertical forward plate 30. In other examples, the vertical main plate 24 and vertical forward plate 30 are connected in such a manner that the connection forms an S shape or a Z shape when viewed from the top or bottom. In still other examples, the vertical spacer member 38 is integral with one or both of the vertical main plate 24 and the vertical forward plate 30. In such an example, the bracket 42 may or may not be provided. In any case, the multi-planar design of the frame extension 10, wherein the vertical main plate 24 lies in a first plane and the vertical forward plate 30 lies in a second plane that is parallel to and outward of the first plane, allows for attachment of accessories to the frame extensions 10 that might otherwise not be able to be attached to the frame rails 12, 13.

Now turning to FIGS. 4 and 5, an alternative embodiment of a frame extension 100 will be described. Like components of the frame extension 100 which were already described with respect to the frame extension 10 of FIGS. 1-3 will not be described further herein. As with the frame extensions 10 and 11, the frame extension 101 is a mirror image of the frame extension 100 described below. The frame extension 100 includes at least one additional flange 60, 64 abutting the outer face 36 of the vertical forward plate 30. One additional flange 60 is an angled flange located below the horizontal main flange 32 and has a rear end 61 connected to a bottom face of the horizontal main flange 32. The additional flange 60 is connected to an underside of the horizontal main flange 32 by way of a rib 62. Another additional flange 64 connected to the outer face 36 of the vertical forward plate 30 is a horizontal flange located above the horizontal main flange 32 and connected by a rib 66 to a top surface of the horizontal main flange 32. A vertical rib 68 is connected between a bottom surface of the horizontal bracket 46 and the top surface of the horizontal main flange 32. These additional flanges 60, 64 and vertical rib 68 provide strength to the frame extension 100, which allows the frame extension 100 to be used, for example, with a snow plow attachment, which may weigh up to as much as 2500 pounds. In contrast, the frame extension 10 shown in FIGS. 1-3 can be used with, for example, a 40 k winch pull.

Figure 4:
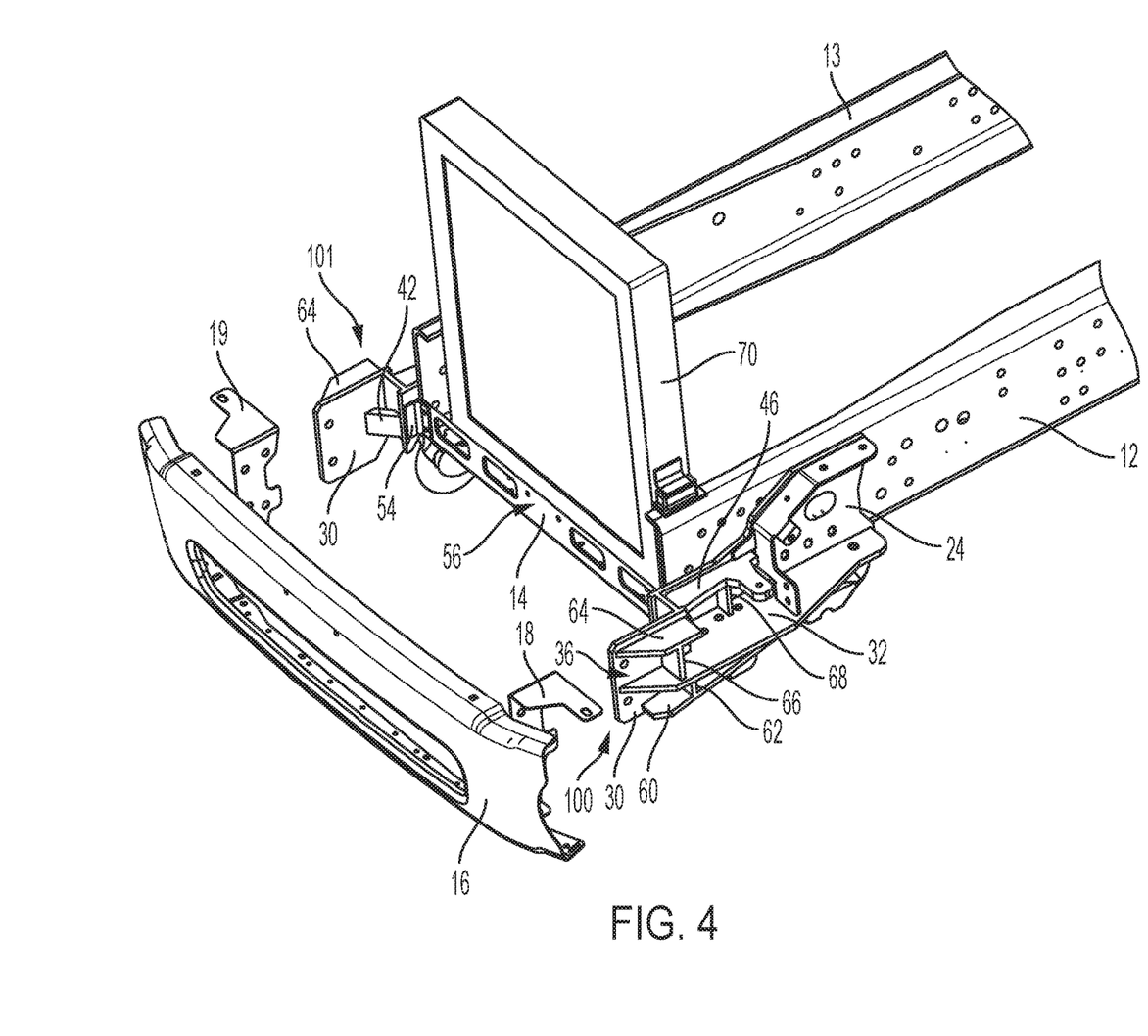
FIG. 4 illustrates another embodiment of a frame extension on a vehicle frame according to the present disclosure.
Figure 5:
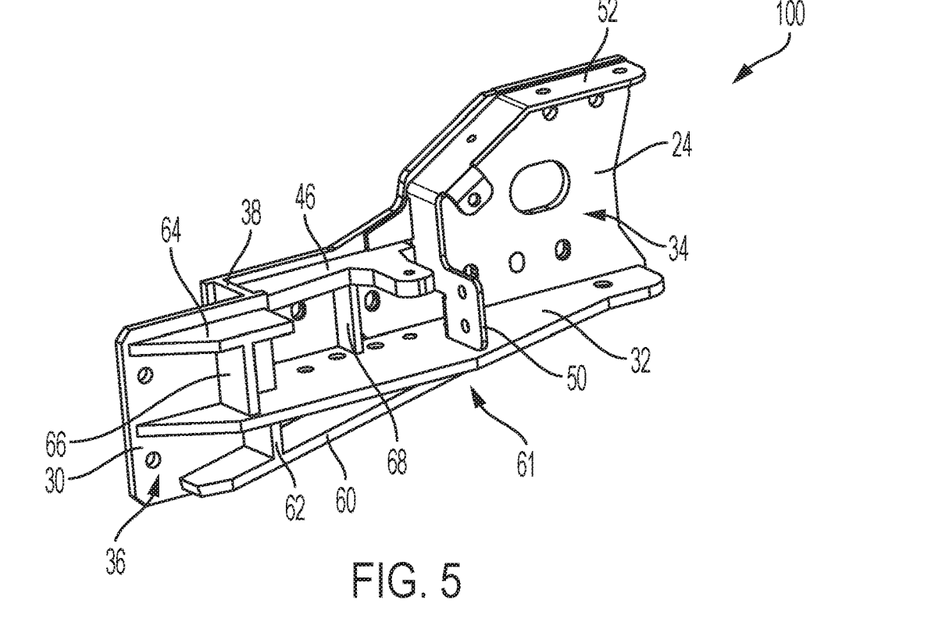
FIG. 5 illustrates a perspective view of the frame extension of FIG. 4 in isolation.

Also shown in FIG. 4 is an OEM radiator 70. The radiator 70 sits atop a ledge on the OEM cross member 14. Because the OEM cross member 14 does not need to be moved during installation of the frame extensions 10, 11, 100, 101 as described herein above, the radiator 70 also does not need to be moved during installation of the frame extensions 10, 11, 100, 101. Although the radiator 70 is not shown in the embodiment of FIG. 1, it should be understood that the radiator is located in the same position as that shown in FIG. 4.

Figure 6:
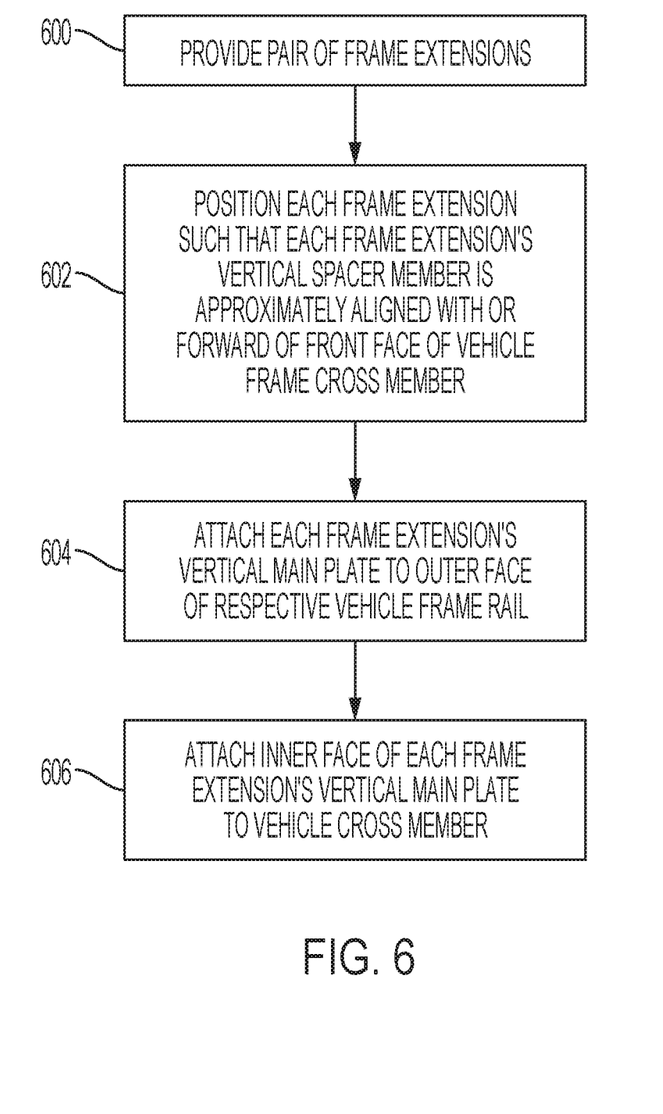
FIG. 6 illustrates a method according to the present disclosure.

FIG. 6 illustrates a method according to the present disclosure for extending a frame of a vehicle having a pair of longitudinal frame rails 12, 13 and a cross member 14 connecting the pair of frame rails 12, 13. As shown at 600, the method includes providing a pair of frame extensions 10, 11 or 100, 101. As described with respect to FIGS. 1-5, each frame extension 10, 11 or 100, 101 has a vertical main plate 24 having an inner face configured to attach to an outer face of a respective frame rail 12, 13 in the pair of frame rails; a vertical forward plate 30 parallel to the vertical main plate 24 and offset from the vertical main plate 24 such that when the frame extension 10, 11 or 100, 101 is installed on the respective frame rail 12, 13, the vertical forward plate 30 is located outwardly of the vertical main plate 24; a horizontal main flange 32 abutting an outer face 34 of the vertical main plate 24 and abutting an outer face 36 of the vertical forward plate 30; and a vertical spacer member 38 connecting the outer face 34 of the vertical main plate 24 to an inner face 40 of the vertical forward plate 30.

Next, the method comprises positioning each frame extension 10, 11 or 100, 101 such that each vertical spacer member 38 is approximately aligned with or forward of a front face 56 of the cross member 14, as shown at 602 and depicted in FIGS. 1 and 4. The method next includes attaching each vertical main plate 24 to the outer face of the respective frame rail 12, 13, such as by bolting, riveting, or other known attachment method, as shown at 604. The method also includes attaching the inner face 26 of each vertical main plate 24 to the cross member 14, as shown at 606 and depicted in FIGS. 1 and 4. For example, the method may further comprise connecting the inner face 26 of the vertical main plate 24 to the cross member 14 with a bracket 54, such as by bolting, riveting, or other known attachment method.

In some examples, the method further comprises removing opposite ends of the cross member 14 that extend outwardly of the frame rails 12, 13 before attaching each vertical main plate 24 to the outer face of a respective frame rail 12, 13 (step 604) and attaching the inner face 26 of each vertical main plate 24 to the cross member 14 (step 606).

Figure 4A:
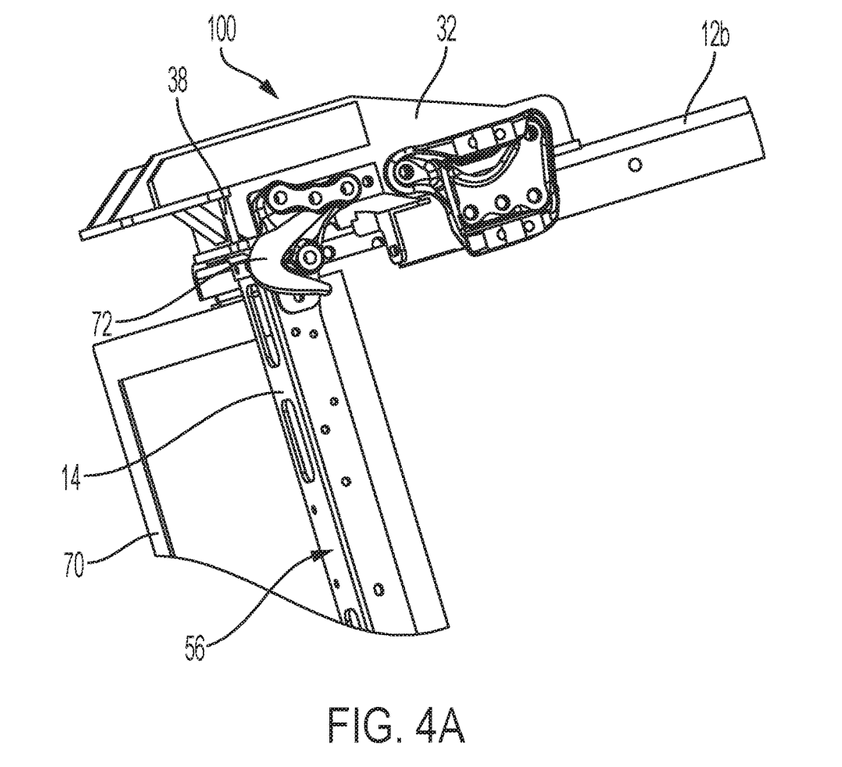
FIG. 4A illustrates a detailed view of an underside of the frame and frame extension of FIG. 4.
Figure 7:
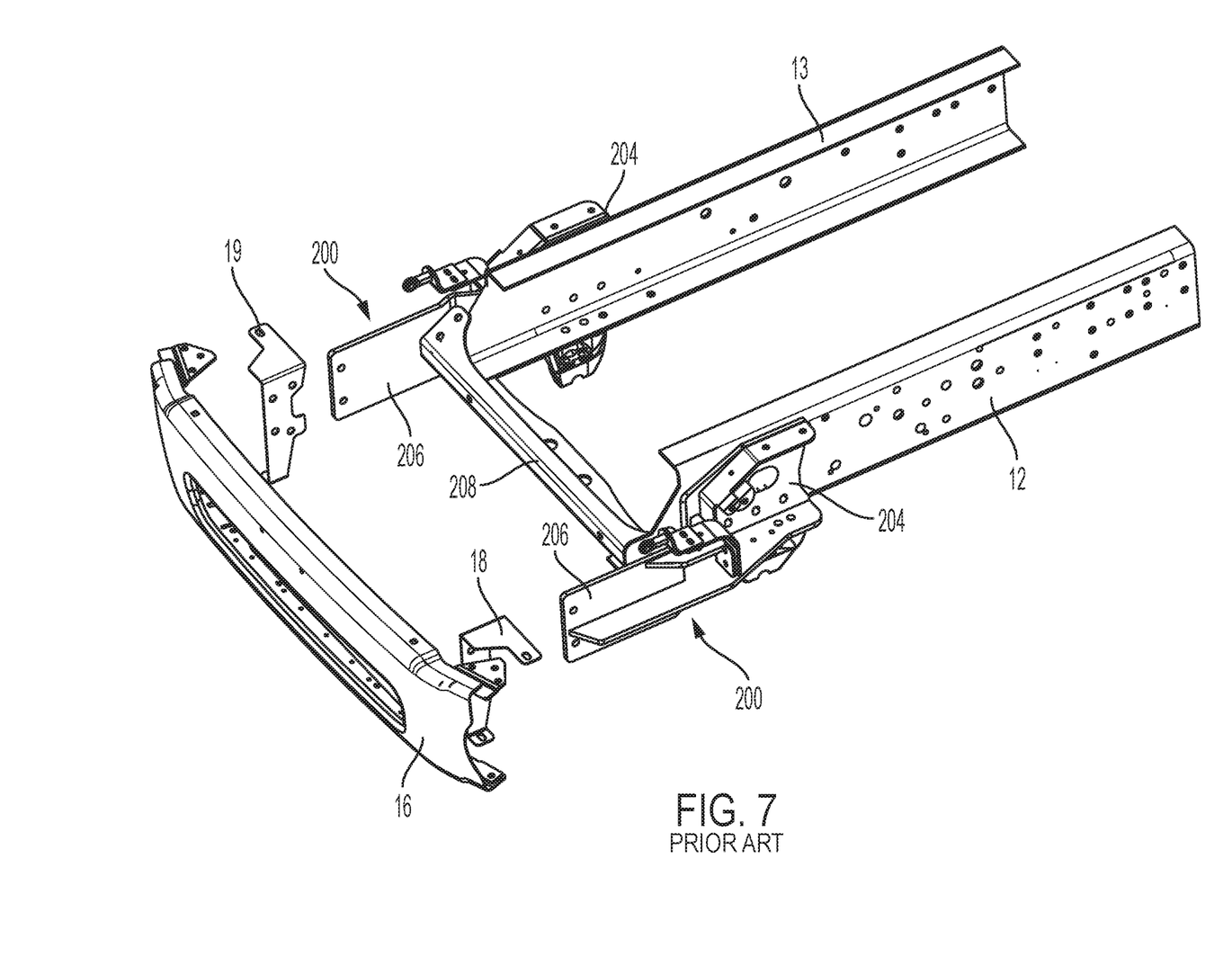
FIG. 7 illustrates a prior art frame extension on a vehicle frame.
Figure 7A:
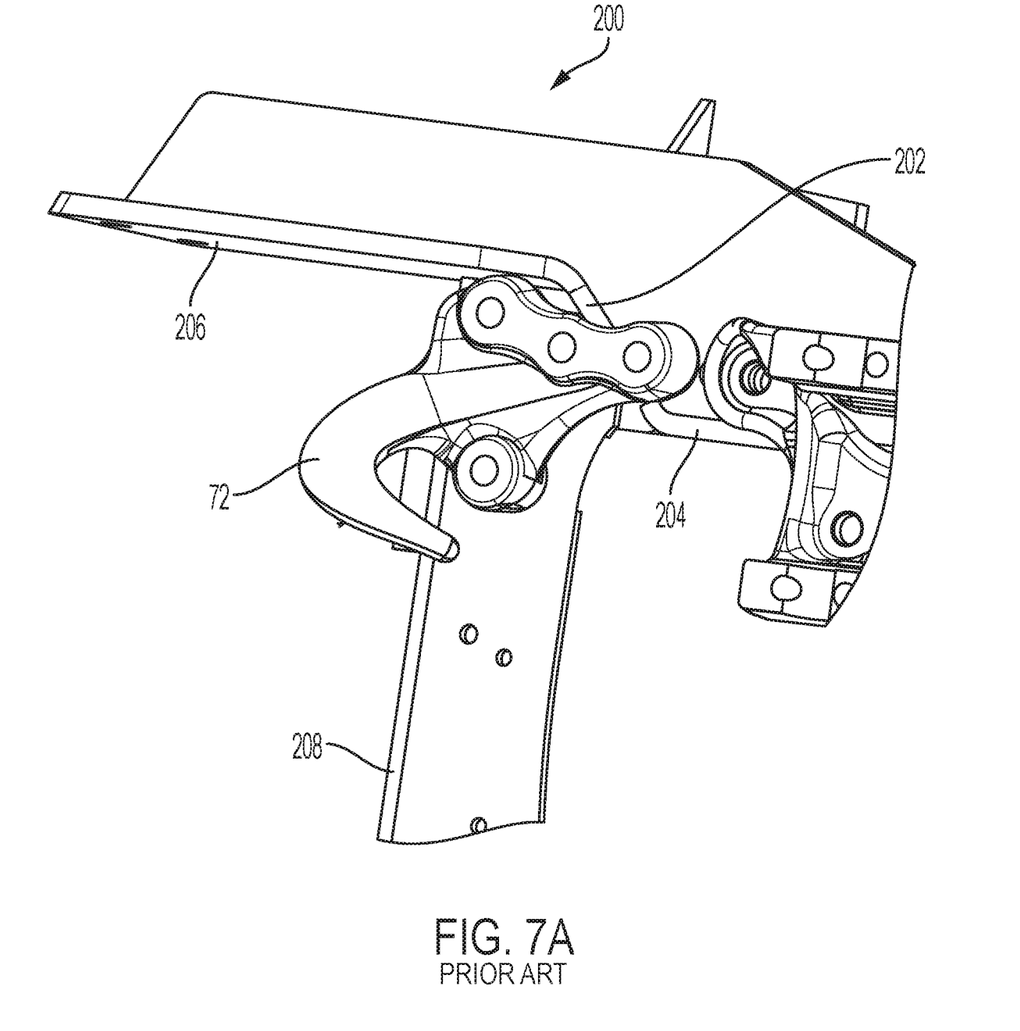
FIG. 7A illustrates a detailed view of an underside of the frame and frame extension of FIG. 7.

FIG. 7 shows a prior art frame extension 200 connected to frame rails 12, 13. The frame extension 200 is also used to mount accessories to the vehicle frame. However, as shown in FIG. 7A, OEM tow hooks 72 are not able to be used with the frame extension 200 because the wall 202 connecting the rearward vertical portion 204 to the forward vertical portion 206 interferes with placement of the OEM tow hook 72. This is because the wall 202 is located rearwardly of the cross member 208 connecting the two frame rails 12, 13. In contrast, returning to FIGS. 4 and 4A, OEM tow hooks 72 are able to be used with the frame extension 100 of the present disclosure because the vertical spacer member 38 does not interfere with placement of the OEM tow hooks 72. As noted herein above, the vertical spacer member 38 is located approximately aligned with or forward of the front face 56 of the cross member 14. Because this same geometry is also true of the frame extension 10 of FIGS. 1-3, OEM tow hooks 72 can be used with the frame extension 10 as well. Thus, the horizontal main flange 32 and the vertical spacer member 38 are configured such that an original equipment manufacturer's tow hook 72 can be attached to a bottom face of the horizontal main flange 32 (such as by bolting) without interfering with the vertical spacer member 38.

The present disclosure is therefore of a frame extension 10, 11, 100, 101 with a multi-planar vertical structure that extends at least four to ten inches beyond the original equipment bumper face. Two or more horizontal, outward facing flanges 32, 60, 64 are provided for added strength. The OEM cross member 14 and radiator 70, as well as the OEM tow hooks 72, can be used with the assembly of the present disclosure.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims. It should be understood that the method steps recited herein can be performed in any logical order, not only the order in which they are described.

What is claimed is:

1. A frame extension for a vehicle having a pair of longitudinal frame rails and a cross member connecting the pair of frame rails, the frame extension comprising:
   a vertical main plate having an inner face configured to attach to an outer face of a frame rail in the pair of frame rails;
   a vertical forward plate parallel to the vertical main plate and offset from the vertical main plate such that when the frame extension is installed on the frame rail, the vertical forward plate is located outwardly of the vertical main plate;
   a horizontal main flange abutting an outer face of the vertical main plate and abutting an outer face of the vertical forward plate;
   a vertical spacer member connecting the outer face of the vertical main plate to an inner face of the vertical forward plate; and
   a bracket connected between the inner face of the vertical forward plate and a front face of the vertical spacer member;
   wherein the inner face of the vertical main plate is configured to attach to the cross member; and
   wherein the vertical spacer member is configured to be approximately aligned with or forward of a front face of the cross member when the frame extension is installed on the frame rail.

2. The frame extension of claim 1, further comprising a bracket connecting the inner face of the vertical main plate to the cross member.

3. The frame extension of claim 1, further comprising an additional flange abutting the outer face of the vertical forward plate.

4. The frame extension of claim 3, further comprising a vertical rib connecting the horizontal main flange to the additional flange.

5. The frame extension of claim 4, wherein the additional flange is an angled flange located below the horizontal main flange and has a rear end connected to a bottom face of the horizontal main flange.

6. The frame extension of claim 1, wherein the horizontal main flange and the vertical spacer member are configured such that an original equipment manufacturer's tow hook can be attached to a bottom face of the horizontal main flange without interfering with the vertical spacer member.

7. A frame extension for a vehicle having a pair of longitudinal frame rails and a cross member connecting the pair of frame rails, the frame extension comprising:
 a vertical main plate having an inner face configured to attach to an outer face of a frame rail in the pair of frame rails;
 a vertical forward plate parallel to the vertical main plate and offset from the vertical main plate such that when the frame extension is installed on the frame rail, the vertical forward plate is located outwardly of the vertical main plate;
 a horizontal main flange abutting an outer face of the vertical main plate and abutting an outer face of the vertical forward plate;
 a vertical spacer member connecting the outer face of the vertical main plate to an inner face of the vertical forward plate;
 an additional flange abutting the outer face of the vertical forward plate; and
 a vertical rib connecting the horizontal main flange to the additional flange;
 wherein the inner face of the vertical main plate is configured to attach to the cross member;
 wherein the vertical spacer member is configured to be approximately aligned with or forward of a front face of the cross member when the frame extension is installed on the frame rail; and
 wherein the additional flange is a horizontal flange located above the horizontal main flange.

8. A frame extension for a vehicle having a pair of longitudinal frame rails and a cross member connecting the pair of frame rails, the frame extension comprising:
 a vertical main plate having an inner face configured to attach to an outer face of a frame rail in the pair of frame rails;
 a vertical forward plate parallel to the vertical main plate and offset from the vertical main plate such that when the frame extension is installed on the frame rail, the vertical forward plate is located outwardly of the vertical main plate;
 a horizontal main flange abutting an outer face of the vertical main plate and abutting an outer face of the vertical forward plate;
 a vertical spacer member connecting the outer face of the vertical main plate to an inner face of the vertical forward plate;
 a horizontal bracket connected to the outer face of the vertical main plate configured for mounting a hood bracket to the frame extension; and
 a vertical rib connected between the horizontal bracket and the horizontal main flange.

9. A method for extending a frame of a vehicle having a pair of longitudinal frame rails and a cross member connecting the pair of frame rails, the method comprising:
 providing a pair of frame extensions, each frame extension having:
  a vertical main plate having an inner face configured to attach to an outer face of a respective frame rail in the pair of frame rails;
  a vertical forward plate parallel to the vertical main plate and offset from the vertical main plate such that when the frame extension is installed on the respective frame rail, the vertical forward plate is located outwardly of the vertical main plate;
  a horizontal main flange abutting an outer face of the vertical main plate and abutting an outer face of the vertical forward plate;
  a vertical spacer member connecting the outer face of the vertical main plate to an inner face of the vertical forward plate; and
  a horizontal bracket connected to the outer face of the vertical main plate and a vertical rib connected between the horizontal bracket and the horizontal main flange;
 positioning each frame extension such that each vertical spacer member is approximately aligned with or forward of a front face of the cross member;
 attaching each vertical main plate to the outer face of the respective frame rail;
 attaching the inner face of each vertical main plate to the cross member; and
 mounting a hood bracket to the horizontal bracket of each frame extension.

10. The method of claim 9, wherein the pair of frame extensions are particularly provided such that each frame extension has a bracket connected between the inner face of the vertical forward plate and a front face of the vertical spacer member.

11. The method of claim 9, further comprising connecting the inner face of the vertical main plate to the cross member with a bracket.

12. The method of claim 9, wherein the pair of frame extensions are particularly provided such that each frame extension has an additional flange abutting the outer face of the vertical forward plate.

13. The method of claim 12, wherein each frame extension further comprises a vertical rib connecting the horizontal main flange to the additional flange.

14. The method of claim 13, wherein the additional flange is a horizontal flange located above the horizontal main flange.

15. The method of claim 13, wherein the additional flange is an angled flange located below the horizontal main flange and has a rear end connected to a bottom face of the horizontal main flange.

16. The method of claim 9, further comprising attaching an original equipment manufacturer's tow hook to a bottom face of the horizontal main flange of each frame extension, wherein the horizontal main flange and the vertical spacer member of each frame extension are configured such that the tow hook does not interfere with the vertical spacer member when so attached.

17. The method of claim 9, further comprising removing opposite ends of the cross member that extend outwardly of the frame rails before attaching each vertical main plate to the outer face of a respective frame rail and attaching the inner face of each vertical main plate to the cross member.

18. The method of claim 9, further comprising maintaining the cross member and a radiator attached thereto in place while attaching each vertical main plate to the outer face of the respective frame rail and attaching the inner face of each vertical main plate to the cross member.

* * * * *